A. CHAPMAN.
RELEASING DEVICE FOR STABLES.
No. 180,201. Patented July 25, 1876.
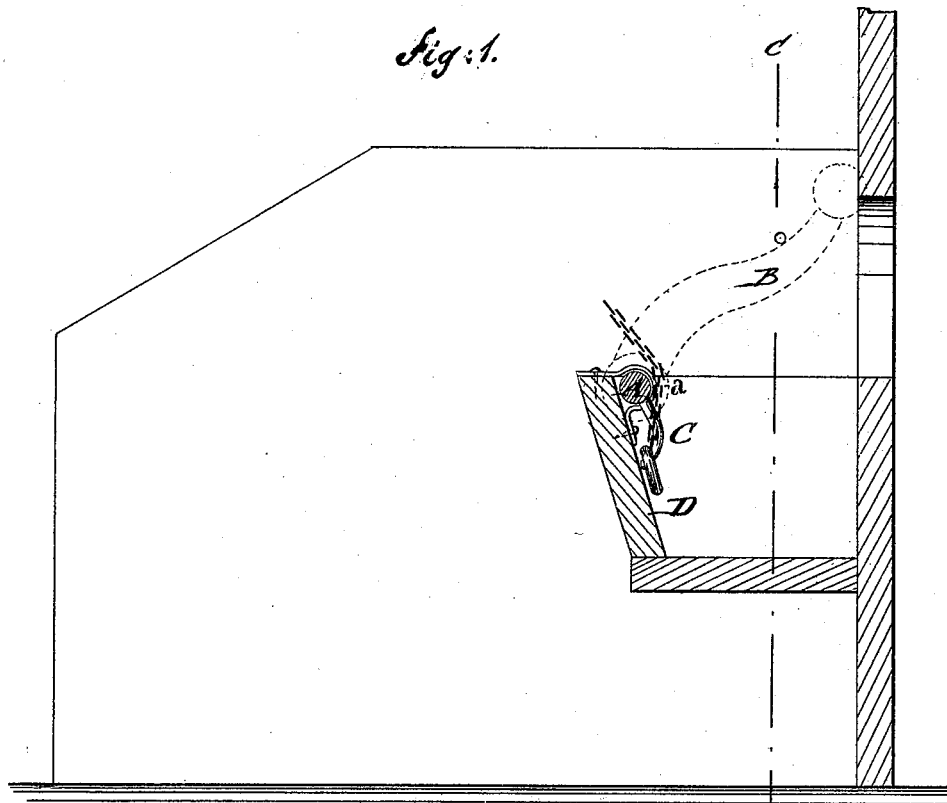
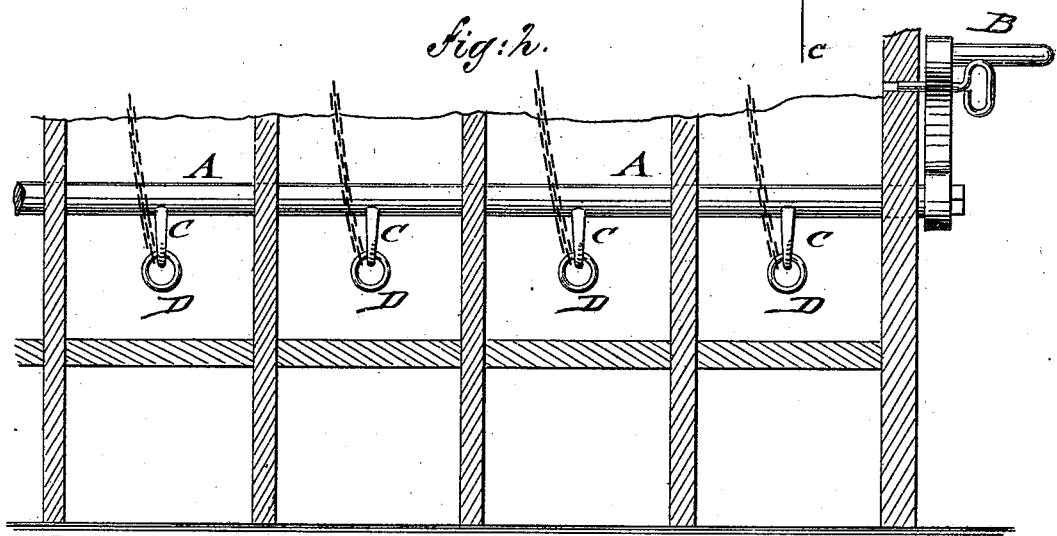

UNITED STATES PATENT OFFICE.

ARTHUR CHAPMAN, OF DOYLESTOWN, PENNSYLVANIA.

IMPROVEMENT IN RELEASING DEVICES FOR STABLES.

Specification forming part of Letters Patent No. 180,201, dated July 25, 1876; application filed June 6, 1876.

*To all whom it may concern:*

Be it known that I, ARTHUR CHAPMAN, of Doylestown, in the county of Bucks and State of Pennsylvania, have invented a new and Improved Device for Loosening Cattle in Case of Fire, of which the following is a specification:

In the accompanying drawing, Figure 1 represents a vertical transverse, and Fig. 2 a vertical longitudinal, section on line *c c*, Fig. 1, of my improved device for loosening cattle in case of fire.

Similar letters of reference indicate corresponding parts.

The invention relates to a simple and readily-operated device for loosening all the horses and cattle in a stable in case of fire, and admitting thereby their escape from danger, without entering the building.

The invention consists of a longitudinal rod that extends along the manger of the stalls, and is hinged thereto, having slightly-curved fingers or hooks, that retain rings, to which the cattle are fastened. A crank attached to the rod at the outside of the building operates the rod, and releases all the rings when turning the same.

In the drawing, A represents a rod, of suitable strength, that extends in longitudinal direction along the manger of a number of stalls, and is retained thereon by means of loosely-encircling bands *a*. The rod A extends to the outside of the building, and is there provided with a crank, B, that is in any suitable manner attached thereto. The rod turns readily in the retaining bands or clasps when the crank is operated, and releases thereby the contact of curved fingers or hooks C with the front board of the manger, one finger being arranged for each stall.

Loose rings D are placed in the fingers, and retained by them on the manger when carried down, so that the ends of the fingers form contact therewith. The horses and cattle are attached by straps or chains to the loose rings, which are rigidly retained by the fingers and rod until, in case of fire, it is desired to release all the animals. The crank is then turned, which operation is assisted by the pulling of the frightened animals, until the fingers swing up and admit the release of all the rings, and thereby the loosening of all the animals in the stable, so that they can escape without being destroyed by fire.

The operation of loosening is accomplished without danger from the outside, where the crank may also be locked by a pin or other suitable device, as shown in Fig. 2, to prevent any accidental detaching by cattle coming in contact with the crank or otherwise.

Having thus described my invention, I claim as new and desire to secure by Letters Patent—

The combination, with the manger of a stable, of rotary rod A, held by loose bands *a*, and the hooks C, having rings D, substantially as shown and described, for the purpose specified.

ARTHUR CHAPMAN.

Witnesses:
 WM. STUCKERT,
 JAMES GILKYSON.